United States Patent
Kim

(10) Patent No.: US 8,285,280 B2
(45) Date of Patent: Oct. 9, 2012

(54) LOCATION UPDATING METHOD AND APPARATUS FOR MOBILE TERMINAL IN RADIO NETWORK

(75) Inventor: Sang Mook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 12/343,118

(22) Filed: Dec. 23, 2008

(65) Prior Publication Data

US 2009/0170507 A1 Jul. 2, 2009

(30) Foreign Application Priority Data

Dec. 26, 2007 (KR) .................. 10-2007-0137153

(51) Int. Cl.
*H04W 4/00* (2009.01)
(52) U.S. Cl. .................. 455/433; 370/331; 370/338
(58) Field of Classification Search .............. 455/433, 455/436; 370/331
See application file for complete search history.

(56) References Cited

U.S. PATENT DOCUMENTS

| | | | |
|---|---|---|---|
| 5,590,175 A * | 12/1996 | Gallant et al. | 455/433 |
| 2005/0070283 A1 * | 3/2005 | Hashimoto et al. | 455/435.1 |
| 2006/0094423 A1 * | 5/2006 | Sharma et al. | 455/433 |

* cited by examiner

*Primary Examiner* — Marcos Batista
(74) *Attorney, Agent, or Firm* — Jefferson IP Law, LLP

(57) ABSTRACT

A location updating method and apparatus for a mobile terminal in a radio network is provided for preventing a location updating request of a mobile terminal from being rejected by a network with an invalid cause of a rejection. The location updating method for a mobile terminal includes receiving a location updating reject message from a first network, the location updating reject message including a cause of a rejection indicating that the mobile terminal is not registered with the first network, checking a first network information of the first network, determining whether the first network information differs from a second network information of a second network, maintaining, when the first and second network information are different from each other, an operational state of the mobile terminal as a valid state, and requesting, when the home network is discovered, the home network for a location updating.

25 Claims, 5 Drawing Sheets

LOCATION UPDATING METHOD AND APPARATUS FOR MOBILE TERMINAL IN RADIO NETWORK

PRIORITY

This application claims the benefit under 35 U.S.C. §119 (a) of a Korean patent application filed in the Korean Intellectual Property Office on Dec. 26, 2007 and assigned Serial No. 10-2007-0137153, the entire disclosure of which is hereby incorporated by reference.

BACKGROUND OF THE INVENTION

1. Field of the Invention

The present invention relates to a radio network and. More particularly, the present invention relates to a location updating method and apparatus for a mobile terminal in a radio network that is capable of preventing a network from rejecting a location updating request of the mobile terminal when the cause of the rejection is invalid.

2. Description of the Related Art

In a radio network, if the location updating request of a mobile terminal has been accepted, the radio network allocates a Temporary Mobile Subscriber Identity (TMSI) to the mobile terminal. The radio network sends the TMSI in a location updating accept message to the mobile terminal. The mobile terminal then identifies itself with the TMSI. The location updating is a procedure for informing the network whether an International Mobile Station Identity (IMSI) stored in the mobile terminal and a Subscriber Identity Module (SIM) card is activated or deactivated.

In a case that the location updating request is rejected, the network informs the mobile terminal that the SIM or Universal SIM (USIM) is invalid such that the mobile terminal is in a limited service state until the mobile terminal is reset or the SIM/USIM is reloaded. The cause of the rejection may be any of (1) an illegal Mobile Equipment (ME) (International Mobile Equipment Identity (IMEI) error), (2) an illegal Mobile Station (MS) (SIM ID error), and (3) an unknown MS identity (ID) (i.e. IMSI) in Home Location Register (HLR) (IMSI_UNKNOWN_IN_HLR).

More particularly, the location update rejection caused by the "unknown IMSI in HLR (IMSI_UNKNOWN_IN_HLR)" occurs when the IMSI included in the location updating request message is not registered with the HLR.

However, the rejection due to "unknown IMSI in HRL" may occur due to a network management problem, e.g. an unintentional drop of the IMSI from a list. In this case, the mobile terminal is regarded as an illegal mobile terminal, even with the valid SIM/USIM card inserted, and thereafter may not receive a normal service from the network.

SUMMARY OF THE INVENTION

An aspect of the present invention is to address at least the above-mentioned problems and/or disadvantages and to provide at least the advantages described below. Accordingly, an aspect of the present invention is to provide a location updating method and apparatus for a mobile terminal that is capable of preventing a location updating request by the mobile terminal from being rejected by a network management problem.

Another aspect of the present invention is to provide a location updating method and apparatus for a mobile terminal that is capable of preventing the mobile terminal from entering a limited service state by an invalid location updating rejection issued by the network.

Still another aspect of the present invention is to provide a location updating method and apparatus for a mobile terminal that is capable of maintaining a valid state of an SIM card, even when a network rejects the location updating request of the mobile terminal, if a Public Land Mobile Network Identity (PLMN ID) of the network differs from a Home PLMN (HPLMN) ID and a Roaming PLMN (RPLMN) ID.

Yet another aspect of the present invention is to provide a location updating method and apparatus for a mobile terminal that is capable of efficiently acquiring and storing information of roaming networks that are referred to for determining validity of a cause of a rejection when the location updating request is rejected by a network.

Another aspect of the present invention is to provide a location updating method and apparatus that is capable of maintaining a valid state of an SIM card when a cause of a reject is invalid as determined from a location updating reject message transmitted by a network such that the mobile terminal can request an HPLMN cell discovered later for the location updating to quickly enter a normal service state.

Another aspect the present invention is to provide a location updating method and apparatus that enables a mobile terminal to escape from a limited service state caused by invalid rejection by the network, whereby the mobile terminal returns to a normal service state without rebooting the mobile terminal or reloading an SIM/USIM.

In accordance with an aspect of the present invention, a location updating method of a mobile terminal is provided. The method includes receiving a location updating reject message from a first network, the location updating reject message including a cause of a rejection indicating that the mobile terminal is not registered with the first network, checking first network information of the first network, determining whether the first network information differs from second network information of a second network, maintaining, when the first and second network information are different from each other, an operational state of the mobile terminal as a valid state, and requesting, when the home network is discovered, the home network for location updating.

In accordance with another aspect of the present invention, a location updating method for a mobile terminal is provided. The method includes checking, when a location updating reject message is received from a visiting network, a cause of a rejection indicated by the location updating reject message, storing, when the cause of the rejection is "unknown International Mobile Station Identity (IMSI) in Home Location Register (HLR)," network information of the visiting network, determining whether the visiting network information is substantially identical with network information of a home network with which the mobile terminal is registered and a roaming network having a roaming contract with the home network, and maintaining, when the visiting network information is not substantially identical with the home and roaming network information, a service state of the mobile terminal as a valid state.

In accordance with another aspect of the present invention, a mobile terminal for updating location information is provided. The mobile terminal includes a radio frequency unit for establishing a radio communication channel with a network to exchange location updating data, a memory unit for storing network information of at least one registered network with which the mobile terminal is registered and the network rejecting a location updating request of the mobile terminal, and a control unit for determining whether the network rejecting the location updating request is substantially identical with the at least one registered network and for maintaining, when the network rejecting the location updating request is not substantially identical with the at least one registered network, a service state of the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, a location updating method and apparatus is provided for allowing a mobile terminal to efficiently exit from a limited service state caused by an invalid location updating rejection by a radio network, whereby the mobile terminal quickly returns to a normal service station without rebooting the mobile terminal or reloading a SIM/USIM.

In exemplary embodiments of the present invention, when the location updating is rejected with the cause of the rejection being "unknown mobile terminal identity (ID) (i.e. IMSI) in HLR (IMSI_UNKNOWN_IN_HLR)" the mobile terminal determines whether the cause of the rejection is valid. If it has been determined that the cause of the rejection is invalid, the mobile terminal sets an SIM state to a valid state. Accordingly, the mobile terminal, with the valid SIM state, can stay in the normal service state through the location updating with an HPLMN or RPLMN.

In a case when a mobile terminal locates in an area in which a different service provider's PLMN exists, the mobile terminal may send the location updating request message to a Visiting PLMN (VPLMN) rather than the HPLMN or RPLMN.

Figure 1A:
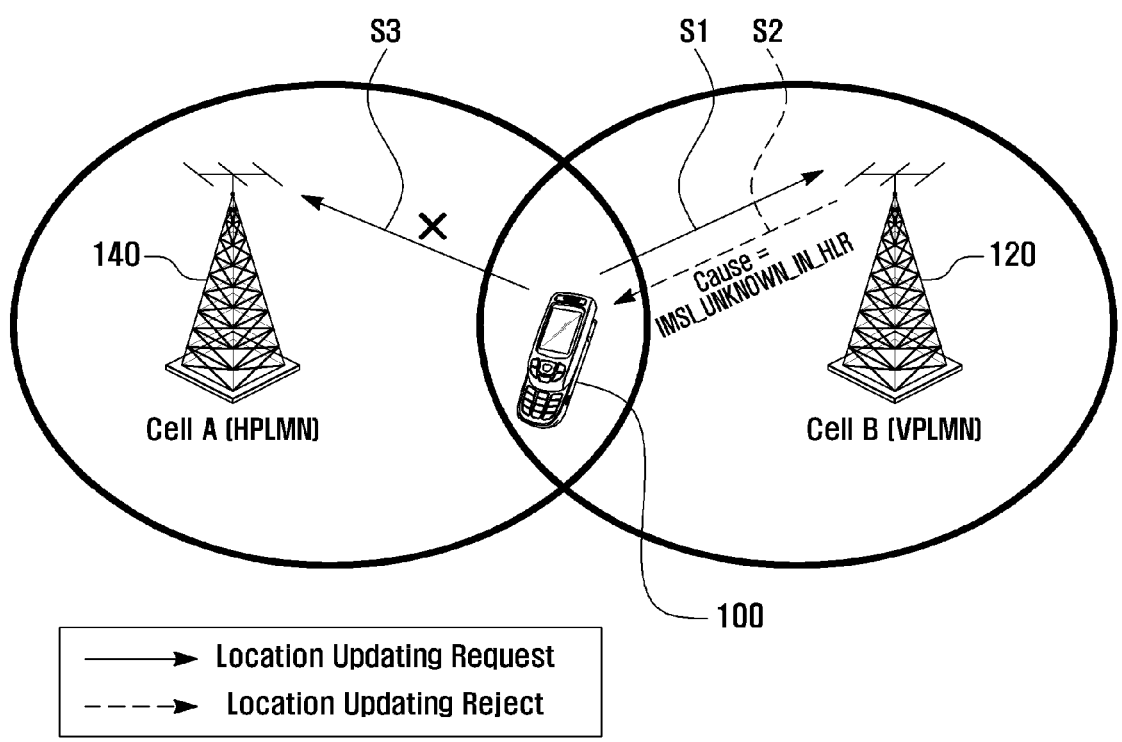
FIG. 1A is a diagram illustrating a radio network in which location updating of a mobile terminal is rejected due to "unknown IMSI in HLR" by a Visiting PLMN (VPLMN)
Figure 1B:
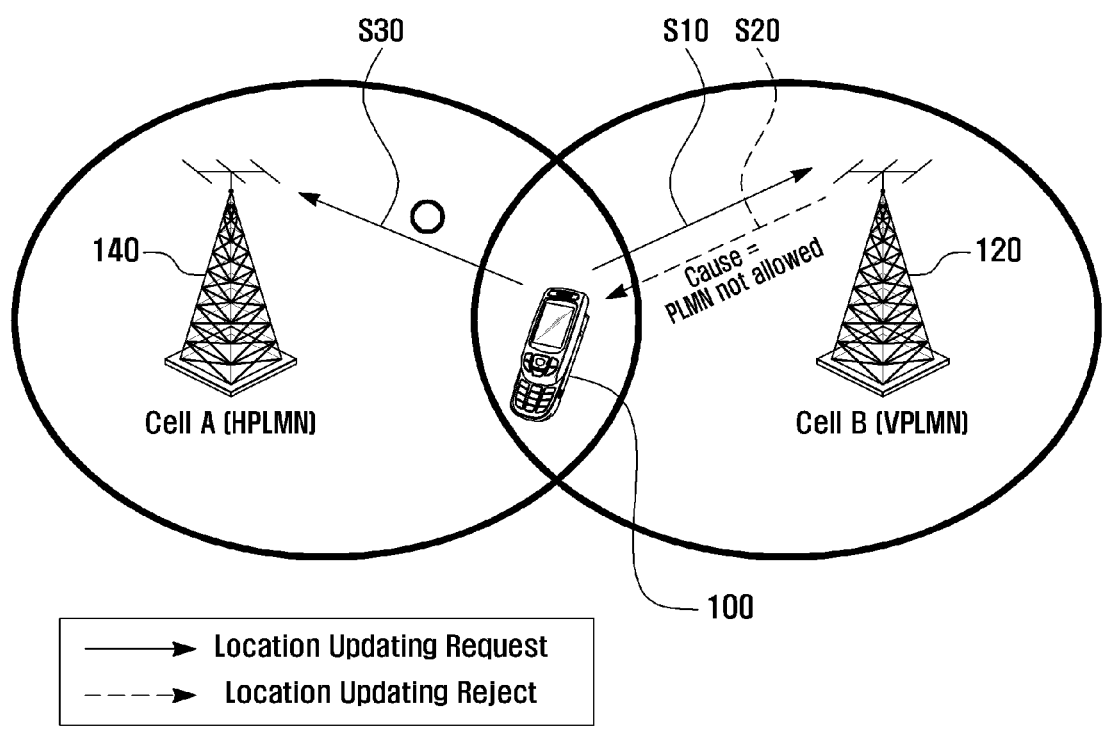
FIG. 1B is a diagram illustrating a radio network in which location updating of a mobile terminal is rejected due to "PLMN not allowed" by a VPLMN.

FIG. 1A is a diagram illustrating a radio network in which location updating of a mobile terminal is rejected due to "unknown IMSI in HLR" by a VPLMN, and FIG. 1B is a diagram illustrating radio network in which location updating of a mobile terminal is rejected due to "PLMN not allowed" by a VPLMN.

In FIGS. 1A and 1B, since a mobile terminal 100 does not request location updating to a Forbidden PLMN (FPLMN) registered with its SIM/USIM, it is assumed that the VPLMN 120 is not registered with the SIM/USIM as an FPLMN.

The mobile terminal 100 first sends a location updating request message to the VPLMN 120 (see solid line arrow S1 in FIG. 1A and S10 in FIG. 1B). In response to the location updating request message, the VPLMN 120 sends a location updating reject message to the mobile terminal 100 (see dotted line arrow S2 in FIG. 1A and S20 in FIG. 1B). The location updating reject message contains a cause of a rejection set to one of "PLMN not allowed," "Location area not allowed," and "Roaming not allowed in this location area."

If the location updating reject message has been received, the mobile terminal 100 may enter a limited service state but, when another RPLMN having different Location Area Identity (LAI) includes PLMN ID and Location Area Code (LAC) or an HPLMN 140 is discovered later, it may attempt location updating with another RPLMN or HPLMN 140 to enter a normal service state (see arrow S30 in FIG. 1B).

As shown in FIG. 1A, however, when the VPLMN 120 sets the cause of the rejection of the location updating reject message to "unknown IMSI in HLR" because of its network management problem, the mobile terminal 100 sets the SIM state to an invalid state. In this case, the mobile terminal cannot request location updating to another RPLMN or HPLMN 140 discovered later (see solid arrow S3 in FIG. 1A).

When the cause of the rejection in the location updating reject message is set to "unknown IMSI in HLR," the mobile terminal determines whether the cause of the rejection is valid. If the cause of the rejection is invalid, the mobile terminal maintains the SIM state as a valid state.

In this case, the problem is how the mobile terminal determines the validity of the cause of the rejection. One clear factor is that a home network or a roaming network to which mobile terminal is subscribed does not reject the location updating request of the mobile terminal with the cause of the rejection being "unknown IMSI in HLR." That is, since a network which is not a home network or a roaming network of the mobile terminal does not register the mobile terminal with its HLR, the network may not need to inquire whether the mobile terminal is registered to the HLR, whereby the location updating rejection of the network due to "unknown IMSI in HLR," is invalid.

That is, the network does not register identity information (i.e. IMSI) of a mobile terminal, which is not subscribed to the network, with the HLR. Accordingly, it is not need to determine whether the mobile terminal requesting location updating through the HLR is subscribed or not, and the rejection due to "unknown IMSI in HLR" has to be invalid.

In the meantime, since the roaming network provides its service to the mobile terminal of which home network has a roaming contract with the roaming network such that, when the mobile terminal requests location updating to the roaming network, the roaming network inquiries whether the mobile terminal is registered with the HLR of the home network. Accordingly, the rejection due to "unknown IMSI in HLR" of the roaming network is valid.

In this manner, the mobile terminal compares the PLMN of the network rejecting the location updating with the cause of the rejection of "unknown IMSI in HLR" and HPLMN and RPLMN and determines whether the cause of the rejection is valid according to the comparison result.

Structures of the mobile terminal in FIG. 1 are described hereinafter with reference to FIG. 2.

Figure 2:
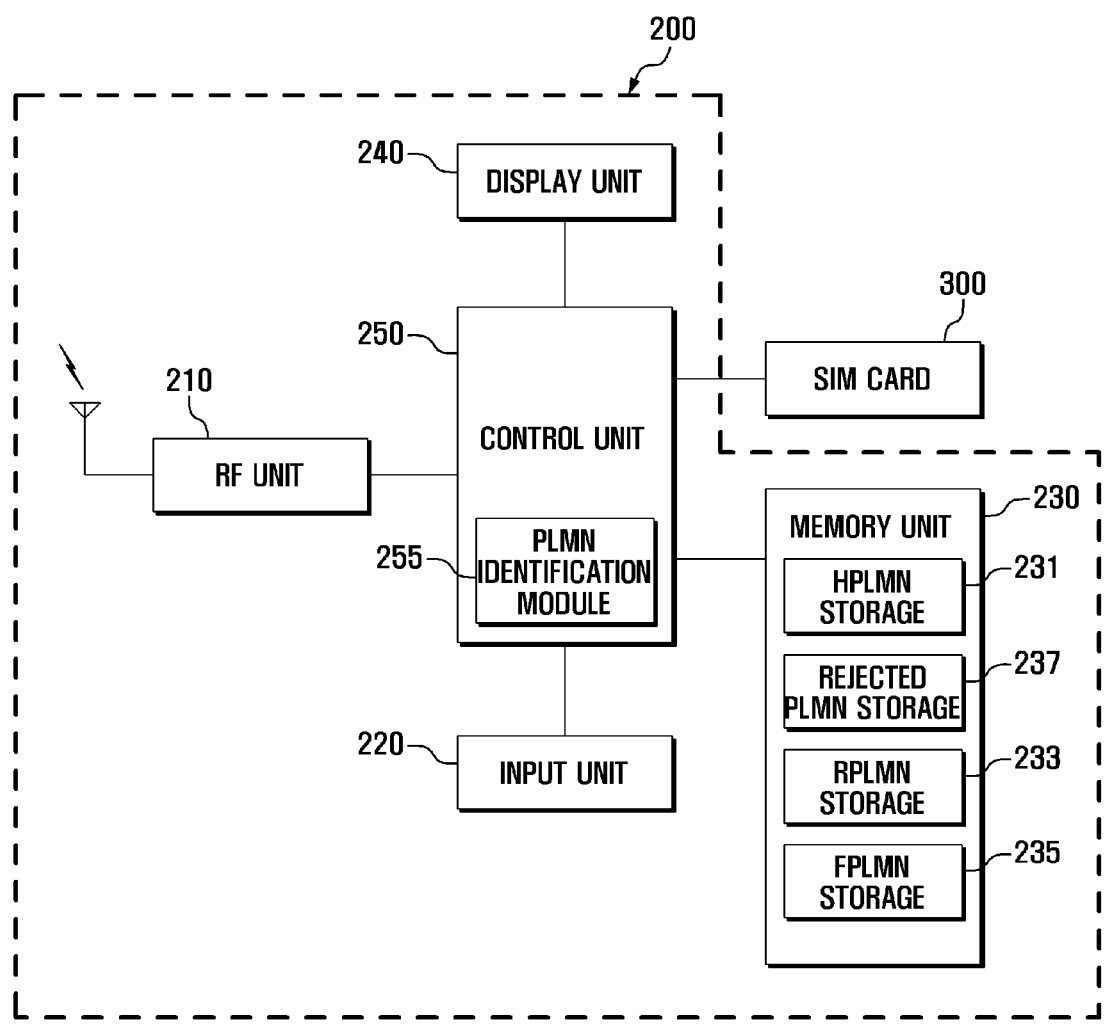
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

In FIG. 2, the mobile terminal 200 includes a Radio Frequency (RF) unit 210, an input unit 220, a memory unit 230, a display unit 240, and a control unit 250.

Referring to FIG. 2, the RF unit 210 is responsible for radio communication of the mobile terminal 200. The RF unit 210 establishes a communication channel with a radio network for voice and data communications. The RF unit 210 includes an RF transmitter (not shown) for up-converting and amplifying transmission signal and an RF receiver (not shown) for low noise amplifying and down-converting a received signal. More particularly in this exemplary embodiment, the RF unit 210 processes signals carrying the data associated with the location updating of the mobile terminal. The location updating data includes a location updating request message, a location updating accept message, and a location updating reject message.

The input unit 220 is provided with a plurality of alphanumeric keys for receiving alphanumeric data input by a user and function keys for setting and executing various functions of the mobile terminal 200. The input unit 220 sends the key sequence corresponding to a key input to the control unit 250. The input unit 220 may be implemented with at least one of a touchpad, a keypad, a qwerty keypad, and a touchscreen.

The memory unit 230 stores application programs associated with the functions of the mobile terminal, more particularly the location updating method of an exemplary embodiment of the present invention, user data input by a user or received through a radio network, and execution information associated with the execution of the application programs. The memory unit 230 includes at least one buffer for buffering the data generating while the application programs operate.

More particularly in this exemplary embodiment, the memory unit 230 includes an HPLMN storage 231 for storing HPLMN ID of a service provider to which the mobile terminal 200 is subscribed, an RPLMN storage 233 for storing IDs of RPLMNs having a roaming contract with the HPLMN of the mobile terminal 200, an FPLMN storage 235 for storing IDs of FPLMNs rejected after location updating requested by the mobile terminal 200, and a rejected PLMN storage 237 for storing the IDs of the PLMNs rejected after location updating with the rejection due to "unknown IMSI in HLR." Here, in order to avoid requesting location updating with the PLMN IDs stored in the rejected PLMN storage, duplicates of the rejected PLMN IDs are stored in the FPLMN storage 235. The HPLMN information stored in the HPLMN storage 231 and the RPLMN information stored in the RPLMN storage 233 can be downloaded through an Over The Air (OTA) service or stored during a manufacturing stage of the mobile terminal 200.

The display unit 240 displays screen images generated while the application programs execute on the mobile terminal 200, key input data, and an operational status of functions. The display unit 240 can be implemented with a Liquid Crystal Display (LCD), and may support a touchscreen function. In this case, the display unit 240 can work as a part or all of the functions of the input unit 220.

The control unit 250 controls general operations of the mobile terminal 200 and signaling among internal and external components of the mobile terminal 200. The control unit 250 controls cooperative signaling among the RF unit 210, input unit 220, memory unit 230, display unit 240, and SIM card 300. The control unit 250 may includes a data processing unit (not shown) having a codec and a modem.

More particularly in this exemplary embodiment, the control unit 250 includes a PLMN identification module 255 which compares the IDs stored in the HPLMN storage 231 and/or RPLMN storage 233 and IDs stored in the rejected PLMN storage 237 and determines whether the rejected PLMN is substantially identical with the HPLMN or RPLMN.

When location updating is rejected due to "unknown IMSI in HLR," the control unit 250 saves the ID of the PLMN within the rejected PLMN storage 237.

The PLMN identification module 255 of the control unit 250 compares the HPLMN ID stored in the HPLMN storage 231 and/or RPLMN IDs stored in the RPLMN storage 233 with the PLMN IDs stored in the rejected PLMN storage 237. When the HPLMN ID and/or RPLMN IDs are different from the rejected PLMN ID, the control unit 250 determines that the cause of the rejection is invalid so as to maintain the SIM state as a valid state.

That is, when the location updating requested by the mobile terminal 200 is rejected due to "unknown IMSI in HLR," the control unit 250 determines whether the network rejecting the location updating belongs to the HPLMN or RPLMN and, when the network does not belong to the HPLMN or RPLMN, maintains the SIM state as a valid state.

The SIM card 300 may be implemented in a form of detachable card having a microprocessor and a memory chip. The memory chip of the SIM card stores subscriber information such as a phone number, a password, and billing account information, and network registration information that is loaded for use of communication services provided by a network. More particularly in this exemplary embodiment, the SIM card 300 stores at least one of HPLMN ID, RPLMN ID, FPLMN ID, and terminal information. For this purpose, the SIM card 300 may be provided with an additional information storage. The information storage can be implemented with another memory chip or provided at a part of the memory chip.

The SIM card 300 also contains SIM information as unique information. That is, the SIM card 300 may have an allocated serial number for identifying the SIM card.

The mobile terminal 200 includes a connection interface for receiving the SIM card 300. The SIM card is provided with signal pins for transmitting information such as subscriber information and an Integrated Circuit Card ID (ICCID) such that the signal pins are contacted with corresponding pins provided in the connection interface.

The SIM card 300 may be attached to any of mobile terminals providing a substantially identical connection interface.

Although the mobile terminal and SIM card are depicted in a simplified manner to help with an understanding of operations of the mobile terminal in association with an exemplary embodiment of the present invention, the present invention is not limited thereto, but can be implemented in various structures and with other supplementary components.

Also, although the mobile terminal 200 is schematically depicted in FIG. 2, the structures and functions of the mobile terminal according to an exemplary embodiment of the present invention is not limited thereto. For example, the mobile terminal 200 may further include at least one of a camera module, an electronic settlement module, a digital broadcast receiver module, a local area network module, a battery module, and the like. According to another exemplary embodiment, specific components of the mobile terminal 200 can be omitted or replaced with their equivalent modules. For example, the mobile terminal 200 may be implemented without SIM card 300.

Figure 3:
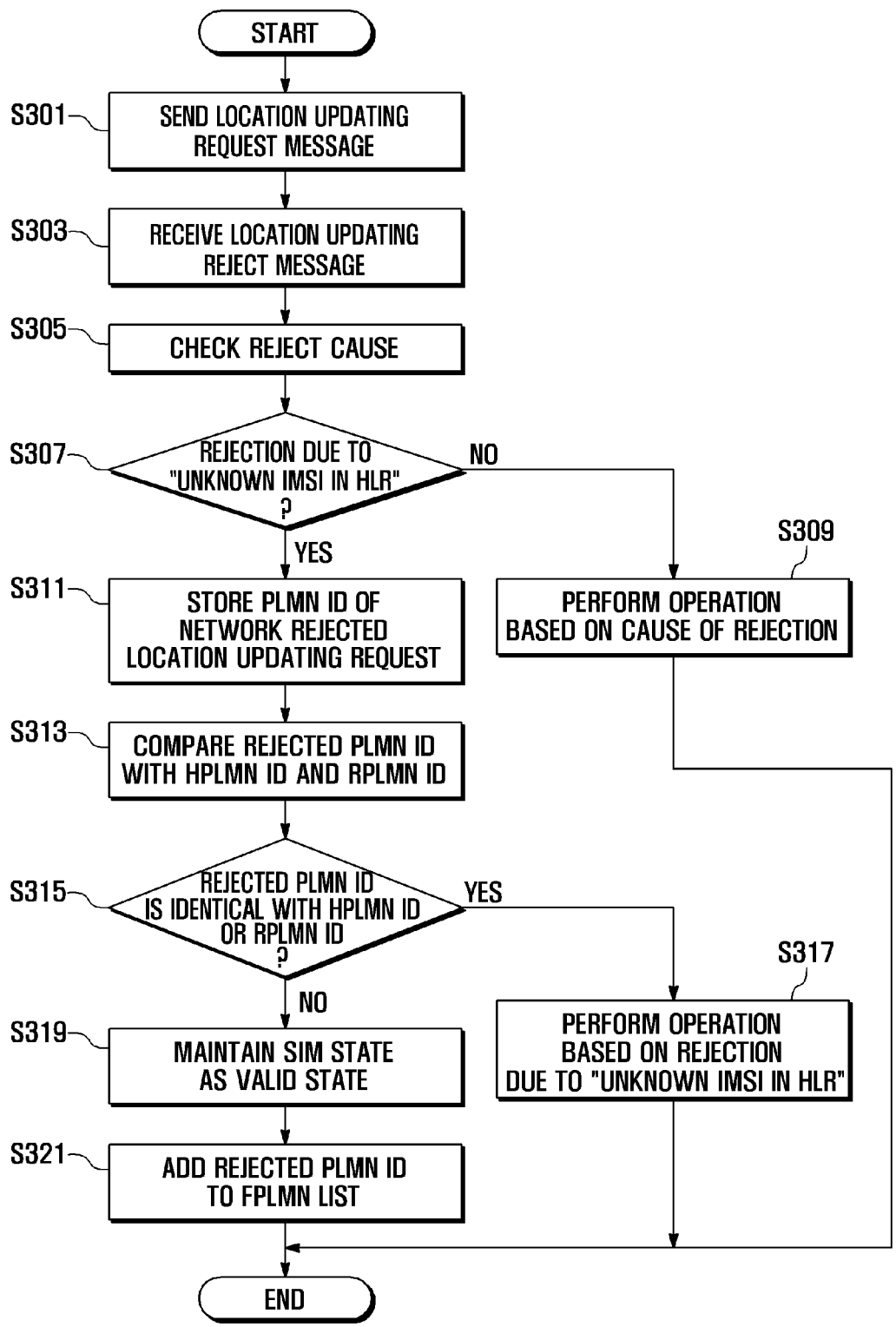
FIG. 3 is a flowchart illustrating a location updating method according to an exemplary embodiment of the present invention.

FIG. 3 is a flowchart illustrating a location updating method according to an exemplary embodiment of the present invention.

Referring to FIG. 3, a mobile terminal sends a location updating request message to a network in step S301. In this exemplary embodiment, the location updating method is described in a situation when the network rejects the location updating of the mobile terminal. In response to the location updating request message, the mobile terminal receives a location updating reject message transmitted by the network in step S303.

If the location updating reject message has been received, the mobile terminal checks the cause of the rejection indicated by the location updating reject message in step S305 and determines whether the cause of the rejection is "unknown IMSI in HLR" in step S307. If the cause of the rejection is not "unknown IMSI in HLR," the mobile terminal performs an operation based on the cause of the rejection in step S309. For example, if the cause of the rejection is "PLMN not allowed," the mobile terminal searches for an HPLMN having different LAI and requests location updating to the new HPLMN for entering a normal service state.

If the cause of the rejection is "unknown IMSI in HLR," the mobile terminal stores the PLMN ID of the network rejecting the location updating request in the rejected PLMN storage 237 of the storage unit 230 in step S311.

Next, the mobile terminal compares the rejected PLMN ID in step S313 with the HPLMN ID and RPLMN ID and determines whether the rejected PLMN ID is substantially identical with the HPLMN or RPLMN ID in step S315. If the rejected PLMN ID is substantially identical with the HPLMN or RPLMN ID, the mobile terminal performs an operation based on the rejection due to "unknown IMSI in HLR" in step S317.

Otherwise, if the rejected PLMN ID is not substantially identical with the HPLMN ID and RPLMN ID, the mobile terminal sets the SIM state to a valid state in step S319. At this time, the mobile terminal processes other parameters as specified in the standard. Next, the mobile terminal adds the rejected PLMN ID to a forbidden PLMN list stored in the FPLMN storage 235 in step S321.

As described above, if the location updating request is rejected due to "unknown IMSI in HLR," the mobile terminal stores the PLMN ID of the rejected PLMN within the storage unit 230. Next, the mobile terminal compares the HPLMN IDs and RPLMN with the rejected PLMN IDs. When the HPLMN IDs and RPLMN IDs are different from the rejected PLMN ID, the mobile terminal determines that the cause of the rejection is invalid so as to maintain the SIM state as a valid state.

Accordingly, even when the location updating request is rejected due to the network management problem, the mobile terminal can stay in a normal service state.

Figure 4:
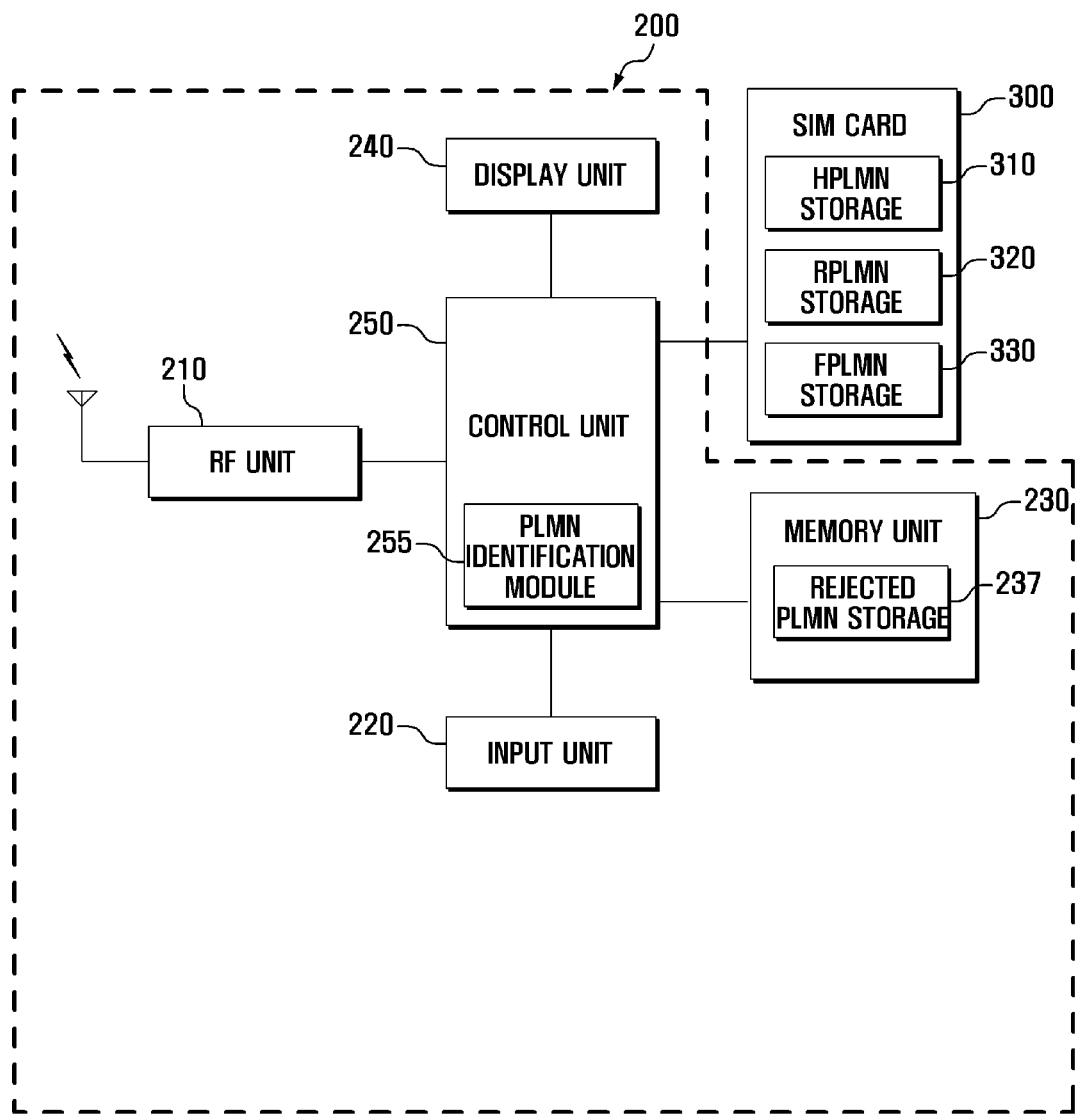
FIG. 4 is a block diagram illustrating a configuration of a mobile terminal according to an exemplary embodiment of the present invention.

FIG. 4 is a block diagram illustrating a configuration of a mobile terminal according to an exemplary embodiment of the present invention. The basic constitution of the mobile terminal depicted in FIG. 4 is substantially identical with that of the mobile terminal of FIG. 2 except that some parts of the memory unit 230 are integrated into the SIM card 300.

Accordingly, detailed descriptions on the substantially identical components are omitted. In this exemplary embodiment, the structures and functions of the memory unit 230 and SIM card 300 that may be different from those depicted in the FIG. 2 and the operations of control unit 250 for controlling the memory unit 230 and SIM card 300 are described in detail.

Referring to FIG. 4, the memory unit 230 includes a rejected PLMN storage 237 for storing the PLMN ID of the network rejecting the location updating request due to "unknown IMSI in HLR." A duplicate of the PLMN ID stored in the rejected PLMN storage 237 can be stored in the FPLMN storage 330 of the SIM card 300 to prevent the rejected PLMN ID from being used to request the rejected PLMN for the location updating at a later time.

In this exemplary embodiment, the control unit 250 compares the rejected PLMN ID stored in the rejected PLMN storage 237 with the PLMN IDs stored in an HPLMN storage 310 and/or RPLMN storage 320 of the SIM card 300. The control unit 250 includes a PLMN identification module 255 which compares the IDs for determining whether the rejected PLMN is substantially identical with the HPLMN or RPLMN.

When the location updating request is rejected, the control unit 250 determines whether the rejection is due to "unknown IMSI in HLR" and stores the PLMN ID rejected the location updating request within the rejected PLMN storage 237 of the memory unit 230.

The PLMN identification module 255 of the control unit 250 compares the rejected PLMN ID stored in the rejected PLMN storage 237 with the HPLMN ID stored in the HPLMN storage 310 and RPLMN ID stored in the RPLMN storage 320. When the rejected PLMN ID is different from the HPLMN ID and/or RPLMN ID, the PLMN identification module 255 determines that the cause of the rejection is invalid such that the control unit 250 maintains a valid state of the SIM card 300.

That is, if the location updating request is rejected due to "unknown IMSI in HLR" and the rejected PLMN is not the HPLMN or RPLMN, the control unit 250 maintain the SIM state as a valid state. In this manner, the mobile terminal can perform location updating with the HPLMN or RPLMN and stay in a normal service state without an unnecessary reset of the mobile terminal.

In the meantime, the SIM card is implemented in a form of detachable card having a microprocessor and a memory chip.

The memory chip of the SIM card stores subscriber information such as a phone number, a password, and billing account information, and network registration information that is loaded for use of communication services provided by a network. More particularly in this exemplary embodiment, the SIM card 300 stores at least one of HPLMN ID, RPLMN ID, FPLMN ID, terminal information, and the like.

For this purpose, the SIM card 300 includes an HPLMN storage 310 for storing HPLMN IDs, an RPLMN storage 320 for storing RPLMN IDs, and an FPLMN storage 330 for storing FPLMN IDs. The HPLMN information stored in the HPLMN storage 310 and the RPLMN information stored in the RPLMN storage 320 can be downloaded through an Over The Air (OTA) service or stored in the manufacturing stage of the mobile terminal 200.

The SIM card 300 also contains SIM information as unique information. That is, the SIM card 300 may have a serial number allocated for identifying the SIM card.

As described above, the location updating method and apparatus of exemplary embodiments of the present invention can prevent the location updating request from being rejected with an invalid cause of a rejection due to a network management problem, thereby improving service stability of the network.

Also, the location updating method and apparatus of exemplary embodiments of the present invention allow for the maintaining of a normal service state of the mobile terminal even when location updating is rejected if the cause of the rejection is invalid, thereby enabling the mobile terminal to keep location updating when it discovers an HPLMN cell at a later time.

Also, the location updating method and apparatus of exemplary embodiments of the present invention enables the mobile terminal to quickly exit from a limited service state caused by an invalid location updating rejection, such that the mobile terminal can quickly recover a normal service state without rebooting the mobile terminal or reloading a SIM/USIM card.

The location updating method and apparatus of exemplary embodiments of the present invention are advantageous in an area where the location updating request is frequently rejected with invalid causes of rejections.

While the invention have been shown and described with reference to certain exemplary embodiments thereof, it should be understood by those skilled in the art that various changes in form and details may be made therein without departing from the spirit and scope of the present invention as defined in the appended claims and their equivalents.

What is claimed is:

1. A location updating method of a mobile terminal, the method comprising:
   receiving a location updating reject message from a first network, the location updating reject message including a cause of a rejection indicating that the mobile terminal is not registered with the first network;
   checking first network information of the first network;
   determining whether the first network information differs from a second network information of a second network;
   maintaining, when the first and second network information are different from each other, an operational state of the mobile terminal by setting a Subscriber Identity Module (SIM) card of the mobile terminal as a valid state; and
   requesting, when a home network is discovered, the home network for a location updating.

2. The method of claim 1, wherein the second network comprises one of the home network with which the mobile terminal is registered and a roaming network having a roaming contract with the home network.

3. The method of claim 1, wherein the second network information is one of preset in the mobile terminal and acquired through an Over The Air (OTA) service.

4. The method of claim 2, wherein the second network information is stored in at least one of an internal memory unit of the mobile terminal and the SIM card.

5. The method of claim 1, wherein the cause of the rejection is that the mobile terminal is an illegal mobile station.

6. The method of claim 5, wherein the cause of the rejection is "unknown International Mobile Station Identity (IMSI) in Home Location Register (HLR)" which indicates that an IMSI of the mobile terminal is not registered in a HLR.

7. The method of claim 6, further comprising:
   storing the first network information; and
   comparing the second network information with the first network information.

8. The method of claim 7, wherein the first and second network information comprise a Public Land Mobile Network IDentity (PLMN ID).

9. The method of claim 7, further comprising:
   entering, when the first network information is identical with the second network information, a limited service state; and maintaining, when the first network information is different from the second network information, a normal service state.

10. The method of claim 9, further comprising adding, when the first network information is different from the second network information, the first network information to a forbidden network list.

11. A location updating method for a mobile terminal, the method comprising:
   checking, when a location updating reject message is received from a visiting network, a cause of a rejection indicated by the location updating reject message;
   storing, when the cause of the rejection is "unknown International Mobile Station Identity (IMSI) in Home Location Register (HLR)," a network information of the visiting network;
   determining whether the visiting network information is identical with network information of a home network with which the mobile terminal is registered and a roaming network having a roaming contract with the home network; and
   maintaining, when the visiting network information is not identical with the home and roaming network information, a service state of the mobile terminal as a valid state by setting a Subscriber Identity Module (SIM) card of the mobile terminal as a valid state.

12. The method of claim 11, wherein the maintaining of the service state of the mobile terminal as the valid state comprises:
   determining that the cause of the rejection is invalid; and
   maintaining the state of the Subscriber Identity Module (SIM) card as a normal service state regardless of the cause of the rejection.

13. The method of claim 12, further comprising:
   searching, when the cause of the rejection is not "unknown IMSI in HLR," for a new home network having a different Location Area Identity (LAI); and
   requesting the new home network for the location updating.

14. The method of claim 12, further comprising adding the network information of the visiting network rejecting the location updating to a Forbidden Public Land Mobile Network (FPLMN) list.

15. A mobile terminal comprising:
- a radio frequency unit for establishing a radio communication channel with a network to exchange location updating data;
- a memory unit for storing network information of at least one registered network with which the mobile terminal is registered and the network rejecting a location updating request of the mobile terminal; and
- a control unit for determining whether the network rejecting the location updating request is identical with the at least one registered network and for maintaining, when the network rejecting the location updating request is not identical with the at least one registered network, a service state of the mobile terminal by setting a Subscriber Identity Module (SIM) card of the mobile terminal as a valid state.

16. The mobile terminal of claim 15, wherein the at least one registered network comprises a home network with which the mobile terminal is registered and a roaming network having a roaming contract with the home network.

17. The mobile terminal of claim 15, wherein the memory unit comprises:
- a Home Public Land Mobile Network (HPLMN) storage for storing network information of at least one home network with which the mobile terminal is registered;
- a Roaming Public Land Mobile Network (RPLMN) storage for storing network information of at least one roaming network having a roaming contract with the at least one home network;
- a Forbidden Public Land Mobile Network (FPLMN) storage for storing network information of at least one network rejecting the location updating request of the mobile terminal; and
- a rejected Public Land Mobile Network (PLMN) storage for storing network information of a network rejecting the location updating request of the mobile terminal with a cause of a rejection being "unknown International Mobile Station Identity (IMSI) in Home Location Register (HLR)."

18. The mobile terminal of claim 17, wherein the network information stored in the rejected PLMN storage is stored in the PLMN storage for preventing the network information from being used for another location updating request.

19. The mobile terminal of claim 17, wherein the network information of the home and roaming networks is one of preset in the mobile terminal and acquired through an Over The Air (OTA) service.

20. The mobile terminal of claim 17, wherein the control unit comprises a network identification module for determining whether the network information rejecting the location updating request of the mobile terminal is identical with the network information of at least one of the home and roaming networks.

21. The mobile terminal of claim 20, wherein the control unit stores the network information of the network rejecting the location updating request with a cause of a rejection being "unknown International Mobile Station Identity (IMSI) in Home Location Register (HLR)" within the rejected PLMN storage.

22. The mobile terminal of claim 20, wherein the control unit maintains an operational state of the mobile terminal as a normal service state when the network information stored in the rejected PLMN storage is different from the network information stored in any of the HPLMN storage and RPLMN storage.

23. The mobile terminal of claim 15, wherein the SIM card stores network information of at least one home network and roaming network and the network information rejecting the location updating request of the mobile terminal.

24. The mobile terminal of claim 23, wherein the SIM card comprises:
- a Home Public Land Mobile Network (HPLMN) storage for storing network information of at least one home network with which the mobile terminal is registered;
- a Roaming Public Land Mobile Network (RPLMN) storage for storing network information of at least one roaming network having a roaming contract with the at least one home network; and
- a Forbidden Public Land Mobile Network (FPLMN) storage for storing network information of at least one network rejecting the location updating request of the mobile terminal.

25. The mobile terminal of claim 24, wherein the control unit maintains a state of the SIM card as a normal service state when the network information stored in the rejected PLMN storage is different from the network information stored in any of the HPLMN storage and RPLMN storage.

* * * * *